Patented Aug. 19, 1941

2,252,858

UNITED STATES PATENT OFFICE 2,252,858

ELECTRIC INSULATING MATERIAL

Martin Mugdan, Munich, and Josef Wimmer, Burghausen, Germany, assignors to Consortium für Elektrochemische Industrie, G. m. b. H., Munich, Germany, a corporation of Germany No Drawing. Application December 20, 1938, Serial No. 246,802. In Germany December 29, 1937

1 Claim. (Cl. 252—66)

This invention relates to electric insulating materials and has for its object to provide an efficient, economical liquid insulating material for use in all kinds of electrical appliances requiring a free-flowing protective insulation of this type.

We have found that liquid carbon-chloride of the formula $C_4Cl_6$, which may be produced by chlorination of dimerous trichlorethylene according to our copending application Serial No. 199,290, filed March 31, 1938 has unexpectedly superior electric insulating properties when used as an insulating material in electrical appliances such as transformers, measuring transformers, condensers, circuit breakers, etc.

The characteristics of this carbon-chloride compound which render it particularly effective as an electric insulating material for the above purposes are:

| | |
|---|---|
| Specific weight | 1.67 |
| Boiling point | 215° C. (760 mm.) |
| Melting point | —19° C. |
| Viscosity (Engler) | 1.1 |
| Disruptive strength | Above 200 kw./cm. |
| Dielectric constant | 2.65 |
| Loss factor | tg=0.0064 |

The dielectric constant and the loss factor of our carbon-chloride compound are therefore similar to the same properties of transformer oil. The disruptive strength surpasses that of oil. The viscosity is considerably less than that of oil, which is favorable for carrying away the heat. Saturation with water reduces the disruptive strength only to about 100 kw./cm., whereas any increase in the water content of oil impairs its strength to a considerably greater extent.

Emulsified water immediately dissociates from $C_4Cl_6$, while it remains emulsified in oil for a considerable time. $C_4Cl_6$ is entirely non-inflammable, is rendered absolutely constant upon adding a trace of an oxidation retarder (e. g. hydroquinone), and is inert to metals, such as copper, iron and tin which are employed in transformer casings, etc. The use of our liquid carbon-chloride $C_4Cl_6$ as a liquid insulating material for the above purposes ordinarily requires no change in the construction of standard transformers, etc. since it is inert to the usual construction materials with the exception of rubber and other hydrocarbons, which are dissolved. The liquid $C_4Cl_6$ may be used as an insulating material by itself, or it may be used in association with other insulating liquids such as oil and hexachlorethane with which it enters into a homogeneous solution and which further lower the freezing point of the mixture.

For the manufacture of our improved liquid insulating material, we found that hexachlorbutene $(C_4H_2Cl_6)$, which is generated by heating trichlorethylene under pressure as disclosed in our application Serial No. 117,903, filed December 28, 1936, quickly splits off a mol of HCl under treatment with metal chlorides at an elevated temperature and goes over into the compound $C_4HCl_5$, which is largely pentachlorbutadien.

As disclosed in our application Serial No. 199,290, filed March 31, 1938, this last mentioned compound can be transformed into heptachlorbutene $(C_4HCl_7)$ by treatment with chlorine in the presence of chlorine carriers, preferably chloride of antimony. The heptachlorbutene has the property of splitting off another mol of HCl by further treatment with metal chlorides. Our carbon-chloride compound of the formula $C_4Cl_6$ is generated during the process. These reactions involving the alternate splitting off of HCl and the addition of chlorine occur with almost quantitative yield.

However, it is not necessary to produce a pure intermediate body, since the chloride catalysts do not adversely affect one another. Chlorination may be effected quite readily after the HCl dissociation from hexachlorbutene in the presence of a chlorinating agent such as a small quantity of chloride of antimony, and thereafter HCl may be split off again at a somewhat higher temperature. Accordingly it is quite possible to perform the operation of the HCl dissociations and the chlorine addition simultaneously by treating hexachlorbutene at an elevated temperature and with simultaneous use of both catalysts with chlorine, whereby the carbon-chloride end product is generated without an intermediate operation with HCl dissociation. It is, however, preferable to allow the process to take place in successive steps so as to obtain the hydrochloric acid entirely free from chlorine and so as not to impair the chlorine addition through the HCl dissociation. Moreover, it is also possible to chlorinate the hexachlorbutene in the first place, whereby octochlorbutane $(C_4H_2Cl_8)$ is produced, and to transform this by treatment with the HCl-dissociation catalyst into the $C_4Cl_6$, whereby two molecules of HCl are split off. For the HCl dissociation, chloride compounds of iron, cobalt and manganese are particularly suitable.

We give below several examples of methods of making our liquid insulating material.

Example 1

1 mol (262 g.) hexachlorbutene was heated with 0.5 g. ferric chloride to a temperature of 70–140° C. After about two hours 1 mol HCl was split off. Thereupon 0.3 g. of antimony chloride was added, and, while stirring, chlorine was added at about 70° C. During the heat development chlorine in the amount of 71 g. was quickly taken up. After the termination of the chlorine take-up, the temperature was raised to 140° to 200° C. A further mol of HCl was split off during this step of the process. Finally the product, $C_4Cl_6$, was freed from the catalysts with diluted hydrochloric acid and water, and distilled. It distilled over under atmospheric pressure at 214°–215° C.

Example 2

1 mol hexachlorbutene was mixed with 0.3 g. chloride of antimony, and treated with chlorine at 80–90° C. while being stirred. 71 g. chlorine were taken up in three hours. The octochlorbutane which was produced was then mixed with 0.5 g. ferric chloride, and heated to 120–200° C. In about two hours 2 mols HCl were split off. The carbonchloride compound thus obtained was found to be identical with that obtained according to Example 1.

Example 3

1 mol hexachlorbutene was mixed with 0.5 g. ferric chloride and 0.7 g. antimony chloride, and treated with chlorine while being stirred at 70° C. The chlorine was absorbed during the simultaneous splitting off of HCl. In order to complete the HCl dissociation the temperature was finally raised to 200° C. The product consisted substantially of the compound $C_4Cl_6$.

The carbon-chloride of the formula $C_4Cl_6$ boils without disintegration at 215° C. (760 mm.); melting point about −20° C. The $C_4Cl_6$ is not changed by heating to temperatures far above the boiling point under pressure, and it is very resistant to metals, to concentrated mineral acids and to aqueous alkali solutions even at elevated temperatures. These factors, together with the other important advantages referred to above, make this material highly effective as a liquid insulation in all situations where oil has heretofore been used for similar purposes.

The invention claimed is:

An electric insulating material comprising an effective insulating quantity of a liquid carbonchloride compound of the formula $C_4Cl_6$ having a melting point of about −20° C. and a boiling point of about 215° C. (760 mm.).

MARTIN MUGDAN.
JOSEF WIMMER.